United States Patent
Liu et al.

(10) Patent No.: US 7,753,984 B2
(45) Date of Patent: Jul. 13, 2010

(54) SLOW AND CONTROLLED-RELEASE POLYMERIC FERTILIZER WITH MULTIPLE NUTRIENTS, PREPARING PROCESS FOR THE SAME AND THE USE METHOD OF THE SAME

(75) Inventors: Yaqing Liu, 1 Xueyuan Road, Jiancaoping District, Taiyuan, Shanxi Province, 030051 (CN); Guizhe Zhao, 1 Xueyuan Road, Jiancaoping District, Taiyuan, Shanxi Province, 030051 (CN); Futian Zhu, Shanxi Province (CN); Xueyi Liu, Shanxi Province (CN)

(73) Assignees: Yaqing Liu, Taiyuan, Shanxi Province (CN); Guizhe Zhao, Taiyuan, Shanxi Province (CN)

( * ) Notice: Subject to any disclaimer, the term of this patent is extended or adjusted under 35 U.S.C. 154(b) by 1041 days.

(21) Appl. No.: 11/400,602

(22) Filed: Apr. 7, 2006

(65) Prior Publication Data
US 2006/0260372 A1    Nov. 23, 2006

(30) Foreign Application Priority Data
Apr. 7, 2005     (CN) ......................... 2005 1 0063260
Nov. 21, 2005    (CN) ......................... 2005 1 0124185

(51) Int. Cl.
*C05D 9/00*   (2006.01)
*C05D 9/02*   (2006.01)
*C05D 5/00*   (2006.01)
*C05D 1/00*   (2006.01)
*C05F 11/00*  (2006.01)
*C05F 3/02*   (2006.01)

(52) U.S. Cl. ............................... 71/11; 711/21; 711/32; 711/64.11; 526/274; 526/303.1; 526/310

(58) Field of Classification Search .................... 71/11, 71/32, 64.11, 21; 526/274, 303.1, 310
See application file for complete search history.

(56) References Cited

U.S. PATENT DOCUMENTS
4,411,683 A    10/1983   Goertz

FOREIGN PATENT DOCUMENTS
JP    10259083      9/1998
RU    2230719    *  6/2004
WO    WO 03/082005   10/2003

* cited by examiner

*Primary Examiner*—Wayne Langel
(74) *Attorney, Agent, or Firm*—Knobbe Martens Olson & Bear LLP

(57) ABSTRACT

This invention relates to a slow and controlled-release polymeric fertilizer with multiple nutrients having the following general formula:

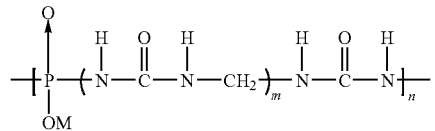

wherein n, m and M are defined in the description.

The polymeric fertilizer of this invention is an environment-friendly slow and controlled-release fertilizer. Its slow and controlled release action lies in self-degradation and hydrolysis. This invention also relates to the preparing process for the fertilizer and the use method of the fertilizer in agriculture.

12 Claims, No Drawings

SLOW AND CONTROLLED-RELEASE POLYMERIC FERTILIZER WITH MULTIPLE NUTRIENTS, PREPARING PROCESS FOR THE SAME AND THE USE METHOD OF THE SAME

This application claims priority to Chinese Patent Application No.: 200510063260.4 filed Apr. 7, 2005 and Chinese Patent Application No.: 200510124185.8 filed Nov. 21, 2005.

TECHNICAL FIELD OF THE INVENTION

This invention relates to a slow and controlled-release polymeric fertilizer with multiple nutrients, in particular relates to an environment-protection slow and controlled-release fertilizer with multiple nutrients. This invention also relates to the preparing process for the fertilizer and the use method of the fertilizer in agriculture.

BACKGROUND OF THE INVENTION

In the prior art, complex-mixing methods are used to obtain the fertilizers with all three elements of nitrogen, phosphorus and potassium, for example, combination of carbamide with potassium dihydrogen phosphate, or mixture of carbamide, calcium phosphate and potassium sulfate. In order to reduce the pollution of fertilizer runoff to the environment, especially to water bodies, slow (controlled)-release fertilizer has become the focus of researches and applications. But the currently available slow-release and controlled-release fertilizers generally adopt coating methods, for example, coating carbamide with a layer of urea-formaldehyde resin film, the coating film is damaged gradually as urea-formaldehyde resin degrading so as to slowly release the fertilizer. WO2003/082005 discloses a preparing method for highly dispersed urea-formaldehyde polymer fertilizer slow-release agent. This polymer achieves slow release of nitrogen fertilizer and the mixture of calcium carbonate, plaster, metallic silicate, talcum powder, sulfur, active carbon, chelated iron, zinc and manganese is added into granulating process. But the material cannot supply phosphorus and potassium needed for crop growth after the material degrades. U.S. Pat. No. 19,810,288,456 discloses a preparing method for solid urea-formaldehyde polymer slow-release fertilizer comprising preparing a liquid mixture of carbamide, formaldehyde and ammonia, heating and acidifing the mixture to start the polymerization of methylene urea, and heating to finish the polymerization of methylene urea, then drying the obtained product which cannot provide phosphorus and potassium needed for crop growth after it degrades in soil. In JP10259083, fertilizer is added into pipes which are biologically degradable polymer, then holes are drilled on the pipes with a certain intervals so that the fertilizer can be released slowly in soil. When the product of JP10259083 is used, the nutrients that the soil can get depend upon the fertilizer ingredients filled into the pipes.

SUMMARY OF THE INVENTION

Different from the prior arts, the present invention surpasses the field of physical mixing and chemically combines three key elements of nitrogen, phosphorus and potassium to form a single polymer and the proportion of each of these three elements can be adjusted in a certain range so as to meet the demands of different crops and soils, therefore, the fertilizer's effective availability is enhanced dramatically. Besides, this invention surpasses the field of coating slow release and makes use of the polymer's gradual biological degradation and hydrolization in soil to release the nutrients that can be absorbed by plants. Therefore, the mechanism of slow and controlled release of the fertilizer of the invention is completely different from that of the ordinary slow-release fertilizers: the slow and controlled-release fertilizer of the present invention depends on degradation and hydrolization of the polymeric fertilizer per se for slow and controlled releasing the nutrients, while the ordinary slow (or controlled)-release fertilizers achieve slow release effect with the help of polymeric coating film.

Generally, one aspect of the invention is to provide a slow and controlled-release polymeric fertilizer. Said slow and controlled-release polymeric fertilizer is a compound with the following general formula:

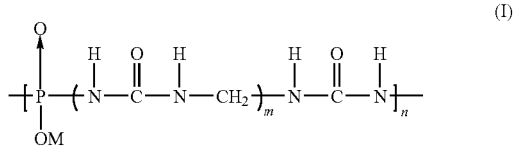
(I)

wherein n is in the range of from 50 to 200, m is in the range of from 0 to 5, and for each repeating unit, M is same or different and is independently selected from the group consisting of K, $NH_4$, $NHCONH_2$ and the like, preferably M is further selected from the group consisting of microelements of Fe, Cu, Zn, Mn and Mg and the like, or of some other microelements needed by crops.

In a preferable embodiment of the slow and controlled-release polymeric fertilizer of the present invention, based on the total mass of the slow and controlled-release polymeric fertilizer, it comprises:

27.9% $K_2O$, 42% $P_2O_5$ and 16.6% N when m is 0 and all M is K;
12% $K_2O$, 18.2% $P_2O_5$ and 28.7% N when m is 3 and all M is K; and
8.2% $K_2O$, 12.5% $P_2O_5$ and 29.4% N when m is 5 and all M is K,
wherein the amounts of K, P and N are calculated as that of $K_2O$, $P_2O_5$ and N respectively.

In addition, the slow and controlled-release polymeric fertilizer of the present invention, based on the total mass of the slow and controlled-release polymeric fertilizer, comprises:
48.4% $P_2O_5$ and 28.6% N when m is 0 and all M is $NH_4$; and
19.5% $P_2O_5$ and 34.5% N when m is 3 and all M is $NH_4$,
wherein the amounts of K, P and N are calculated as that of $K_2O$, $P_2O_5$ and N respectively.

In the slow and controlled-release polymeric fertilizer with multiple nutrients of the invention, the content of nitrogen, phosphorus and potassium can be regulated according to the demand of crops and soils. The adjustable range of the nutrients is 16~35% by mass of N, 13%~48% by mass of $P_2O_5$, 6%~27% by mass of $K_2O$ and 0.1%~1% by mass of each microelement, wherein the contents of K, P and N are calculated as that of $K_2O$, $P_2O_5$ and N respectively.

Another aspect of the invention is to provide a preparing process for the polymeric fertilizer having general formula (I), which comprises:

(1) adding reactants and phosphoric acid into a reactor, heating to generate dihydric phosphate, wherein said reactants are potassium chloride, potassium carbonate or potassium hydroxide and the like. The reactants can also be selected from the group consisting of oxides or hydroxides of Fe, Cu, Zn, Mn, Mg or other metal elements which needed.

(2) adding carbamide and formaldehyde into another reactor, adjusting the pH value to generate methylene urea oligomer at a suitable temperature.

(3) in another reactor, adding the dihydric phosphate obtained in step (1) and product of step (2) or carbamide sufficient to provide needed amount of nitrogen, heating to start the reaction polycondensation, then making the reaction polycondensation continue under the action of the reaction heat; and (4) granulating the melted polycondensation product.

Another aspect of the invention still relates to the use method of the slow and controlled-release polymeric fertilizer having general formula (I) in crops, wherein said fertilizer is applied independently or in combination with farmyard manure. Preferably the crops are fruit crops, and more preferably the crops are maize and potato. Also the slow and controlled-release polymeric fertilizer with multiple nutrients of the invention can be used as special fertilizer containing microelements.

The slow and controlled-release fertilizer of the invention is a polymeric compound integrating three key elements of nitrogen, phosphorus and potassium into a single polymer. After fertilizing, under the action of water and microorganism in soil, the fertilizer gradually degrades and hydrolyzes to produce nutrients which can be absorbed by plants. The degrading and hydrolyzing process are accelerated gradually, so the fertilizer releases nutrients slowly in early phase, fastly in middle phase and again slowly in anaphase, which is exactly coincides with the nutrients demanded cycles by the plants, therefore, the fertilizer's availability is high. Furthermore, the rest comprising elements of the slow and controlled-release fertilizer of the invention are carbon, hydrogen and oxygen besides three key elements of nitrogen, phosphorus and potassium. The fertilizer does not have any elements harmful to soil, its water solution is neutral, innocuous, flavourless, non-corrosive, so it's environment-friendly and will not pollute the environments and leads to no acidulation or alkalization of the soil, thus is environmental-protective fertilizer.

Comparing with the prior arts, this invention has remarkable advantages, for example:

(1) It integrates the nutrients of nitrogen, phosphorus, potassium, iron, copper, zinc, and manganese etc. into a single polymer, so the fertilizer is more convenient for use.

(2) The total nutrients content (N %+$P_2O_5$%+$K_2O$ %) of the fertilizer is from 50% to 86% by mass, therefore, the applying amount of this fertilizer is only ⅓~½ of that of the currently available fertilizers for the same production increasement.

(3) The durative period of the fertilizer can be adjusted according to demand.

(4) The pH value of the water solution of the fertilizer is from 6.5 to 7.5, which is harmless to soils and plants.

(5) After degradating and hydrolyzing, all the nutrients released by the fertilizer can be absorbed completely by the plants with no residues, thus it is an environment-friendly slow and controlled-release fertilizer.

(6) As one of the raw materials, potassium chloride is abundant in resources and low in cost.

DETAILED DESCRIPTION OF THE INVENTION

Embodiments

All the parts and percentages in examples are provided by mass.

1. PREPARATION OF THE SLOW AND CONTROLLED-RELEASE POLYMERIC FERTILIZER WITH MULTIPLE NUTRIENTS OF THE INVENTION

The feeding weights of potassium chloride and phosphoric acid were calculated according to the demand for potassium, then put these raw materials into a acid-proof reactor having stirring device and hydrogen chloride-absorbing device, heated till no more hydrogen chloride was generated and the reaction solution I was obtained. Cooled the reaction solution I to about 60° C. for further use.

The feeding weights of carbamide and formaldehyde were calculated according to the demand for nitrogen, then put these raw materials into another stainless steel reactor having stirring device. Adjusted the pH value to 8~9, heated the system to 80° C. and then reacted for 1 hour to get reaction solution II. Cooled the reaction solution II to about 60° C. for further use.

Solution I and solution II were dumped together into a reactor with powerful stirring device. They reacted instantly and formed a soft solid mass. The mass was sent directly into a granulator to pelltize the fertilizer, dried the fertilizer granule and then got the slow and controlled-release polymeric fertilizer with multiple nutrients of the invention.

The adding methods for the microelements of iron, copper, manganese and zinc etc. is to turn these microelements into dihydric phosphate at first and then add them to reaction polycondensation.

Example 1

Preparation of Special Fertilizer with m=5 and all M is K 2.3 kg of 85% industrial phosphoric acid were put into a 10-liter enamel reactor, then 1.05 kg of potassium chloride Were added. Heated the system untill no more hydrogen chloride was released. 2 kg of water is added and followed by addition of 0.34 kg of potassium hydroxide. Heated the system to 80° C. for further use.

8.1 kg of 37% industrial formaldehyde were added into a 30-liter stainless steel reactor having stirring device. Adjusted the pH value to 8~9, heated the system to 60° C. Then 7.2 kg of carbamide were added in batches. Raised the reaction temperature to 80° C., reacted for 0.5 hours to obtain the product for further use.

The two above-mentioned reaction solutions were mixed together while they were still hot, the mixture was pelltized in a granulator and dried. 11.4 kg of product was got. In the product, the content of N is 29.4%, $P_2O_5$ is 12.5% and $K_2O$ is 8.2%.

Example 2

Preparation of Special Fertilizer with m=3 and all M is K

The same method in Example 1 was used to prepare potassium dihydrogen phosphate solution except that 4.9 kg of 37% industrial formaldehyde were added into a 30-liter stainless steel reactor with stirring device. Adjusted the pH value to 8~9, heated the system to 60° C., and then 4.8 kg of carbamide were added in batches. Raised the temperature to 80° C., reacted for 0.5 hours to obtain the product for further use.

The two above-mentioned reaction solutions were mixed together while they were still hot, the mixture was pelltized in a granulator and dried. 7.8 kg of product was obtained. In the product, the content of N is 28.7%, $P_2O_5$ is 18.2% and $K_2O$ is 12%.

Example 3

Preparation of Special Fertilizer with m=0 and all M is K 6.9 kg of 85% industrial phosphoric acid were added into a 30-liter enamel reactor having stirring device and hydrogen chloride-absorbing device, 3.15 kg of potassium chloride were added. Heated the system till no more hydrogen chloride was released. 3 kg of water and then 1 kg of potassium hydroxide were added. The reaction system was removed into a reactor with high length-diameter ratio while it was still hot. Then 3.6 kg of carbamide were added. The reaction system became a clear and transparent solution when it was heated to above 60° C. When the heating continued to a proper temperature, the system will boil because the polycondensation reaction was a exothermal reaction. When the reaction system became viscous, removed the heater and cooled the obtained product to semi-solid state, then pelltized the product in a granulator and dried. 10.1 kg of product were obtained. In this product, the content of N is 16.6%, $P_2O_5$ is 42.0% and $K_2O$ is 27.9%.

Example 4

Preparation of Special Fertilizer with m=0 and all M is $NH_4$ 6.9 kg of 85% industrial phosphoric acid were added into a stainless steel reactor with high length-diameter ratio, then 4.8 kg of ammonium bicarbonate were added in batches when stirring. Heated the system to 60° C. till no more $CO_2$ was generated, then 3.6 kg of carbamide were added. Raised the temperature untill the reaction solution was in boiling state. When the reaction solution became viscous, removed the heater and cooled the reaction solution to semi-solid state, then pelltized the product in a granulator and dried. 8.8 kg of product were got. In this product, the content N is 28.6%, and $P_2O_5$ is 48.4%.

Example 5

Preparation of Special Fertilizer with m=3 and all M is $NH_4$ 4.6 kg of 85% industrial phosphoric acid were added into a 10-liter stainless steel reactor, and 3.2 kg of industrial ammonium bicarbonate were added in batches when stirring. Heated the system to 60° C. till no more $CO_2$ was generated, and then kept for use.

9.8 kg of 37% industrial formaldehyde were added into a stainless steel reactor having stirring device. Adjusted the pH value to 8~9, raised the temperature to 60° C. 9.6 kg of carbamide were added in batches, and then raised the temperature to 80° C., reacted for 0.5 hours to obtain product for further use.

the two above-mentioned reaction solutions were mixed while they were still hot, then the mixture was pelltized in a granulator and dried. 14.6 kg of product were obtained. In this product, the content of N is 34.5% and $P_2O_5$ is 19.5%.

Example 6

Preparation of Fertilizer Special for Maize 3.5 kg of 85% industrial phosphoric acid were added into a 40-liter enamel reactor, then 1.6 kg of potassium chloride were added. Heated the system till no more hydrogen chloride was released. Then 0.7 kg of ammonium bicarbonate were added in batches, and the reaction continued till no more $CO_2$ was generated. 5.4 kg of carbamide were added and the following-on operations were carried out according to Example 4. 6.8 kg of product were got. In this product, the content of N is 35.7%, $P_2O_5$ is 31.3% and $K_2O$ is 6.1%.

Example 7

Preparation of Fertilizer Special for Potato 5.8 kg of 85% industrial phosphoric acid were added into a 40-liter enamel reactor, then 2.6 kg of potassium chloride were added. Heated the system till no more hydrogen chloride was released. Then 8 kg of carbamide were added and the following-on operations were carried out according to Example 4. 12 kg of product were got. In this product, the content of N is 28%, $P_2O_5$ is 29.6% and $K_2O$ is 9.8%.

Example 8

Preparation of Special Fertilizer with Microelements 4.6 kg of 85% industrial phosphoric acid were added into a 40-liter stainless steel reactor, then 68 g of magnesium oxide and 40 g of zinc oxide were added. After they were dissolved, new prepared 50 g copper hydroxide and 50 g ironic hydroxide were added. After these two components were dissolved, 2.7 kg of potassium carbonate were added. Heated the system till no more $CO_2$ was generated. 3.6 kg of carbamide were added and the following-on operations were carried out according to Example 4. 6.4 kg of slight green product were got. In this product, the content of N is 16.0%, $P_2O_5$ is 42.0%, $K_2O$ is 27.0% and the microelement magnesium, zinc, copper and iron were 0.64%, 0.5%, 0.5% and 0.48%, respectively.

2. Fertilizer Effect Experiments of the Slow and Controlled-Release Polymeric Fertilizer with Multiple Nutrients of the Invention (1) Field Experiment for Maize
① Materials and Methods Soil for experiment: an empty soil in the blank area of Shanxi Agriculture University's experimental seeding nursery was selected as the experimental soil. It was flat, has convenient transportation and irrigation conditions, and was convenient for management and observation. The experimental soil was brown earth of carbonate type with a nature of medium soil and medium fertility. Its representative area was about 1,000 $hm^2$. The prior crops were maize, with 22,500 kg of cattle manure and 1,200 kg of SV fertilizer special for maize applied in each hectare of the field, and the output was about 9,900 $kg/hm^2$.

Fertilizer for the experiment: the slow and controlled-release polymeric fertilizer with multiple nutrients special for maize of the invention.

Crops for the experiment: maize (Jin Dan 42).

Experiment scheme and method: The experiment was made with four arrangements:

(I) Arrangement 1: the fertilizer for the experiment; 0.03 kg/m² (1.5 kg/plot)

(II) Arrangement 2: the fertilizer for the experiment plus farmyard manure (cattle manure); 0.03 kg/m² (1.5 kg/plot) of the fertilizer for the experiment plus 2.25 kg/M² (112.5 kg/plot) of farmyard manure (III) Arrangement 3: Conventional fertilization; 0.12 kg/m² (6 kg/plot) of SV fertilizer special for maize plus 2.25 kg/M² (112.5 kg/plot) of farmyard manure (IV) Arrangement 4: control; with no fertilizer applied.

Each of the four arrangements was repeated four times.

The experimental field was divided into four regions (four repeats) by the method of partial control, and then each region was divided into four plots of 10 m×5 m (four arrangements) with the plot area of 50 m². The plots were arranged randomly in each region, and the arrangements for this experiment were:

| Repeat 1 | Repeat 2 | Repeat 3 | Repeat 4 |
| --- | --- | --- | --- |
| Arrangement 1 | Arrangement 3 | Arrangement 4 | Arrangement 4 |
| Arrangement 4 | Arrangement 4 | Arrangement 2 | Arrangement 2 |
| Arrangement 3 | Arrangement 2 | Arrangement 1 | Arrangement 3 |
| Arrangement 2 | Arrangement 1 | Arrangement 3 | Arrangement 1 |

Before sowing, soil samples were collected from the field by 5-spot sampling method and brought to the laboratory for test and analysis.

Cultivating and sowingg were conducted on 20 May 2004. Ploughing and sowing were carried out after applying determined amount of fertilizer and marking the boundaries and plots with wooden signs. The quantity of seeds was 90 kg/hm² and weedicide "ETHOXALAMINE" was applied after sowing. The crops were irrigated twice on 24 June and 30 July by plot independent irrigating method and earthed up on 26 July. There were few weeds in the field with weedicide being applied and there was no disaster in 2004. The corns were harvested plot by plot on 13 October and threshed at the site. The output of each plot was weighed. The results were recorded in tables.

② Result and Analysis (I) the results of laboratory test and analysis for soil samples of the experiment field were shown in table 1.

TABLE 1

| Analysis result of soil sample of the experiment soil | | | | |
| --- | --- | --- | --- | --- |
| organic substance (g/kg) | alkali nitrogen (g/kg) | available phosphorus (mg/kg) | available potassium (mg/kg) | pH |
| 8.8 | 0.90 | 35.77 | 209.47 | 8.0 |

(II) The experimental results of the output of each plot were shown in Table 2.

TABLE 2

| | | Maize output of experiment plot | | | | |
| --- | --- | --- | --- | --- | --- | --- |
| | | plot output (kg) | | | | |
| experiment arrangement | plot area (m²) | Repeat 1 | Repeat 2 | Repeat 3 | Repeat 4 | average |
| fertilizer for experiment | 50 | 32.4 | 32.7 | 27.6 | 30.5 | 30.8 |
| fertilizer for experiment + farmyard manure | 50 | 58.8 | 58.4 | 62.0 | 57.2 | 59.1 |
| conventional fertilization | 50 | 47.3 | 53.1 | 50.7 | 50.9 | 50.5 |
| control | 50 | 26.5 | 24.4 | 25.0 | 26.9 | 25.7 |

(III) The hectare yield in maize experiment were shown in Table 3.

TABLE 3

| | Hectare yield of each plot in maize experiment | | | | | |
| --- | --- | --- | --- | --- | --- | --- |
| | output (kg/hm²) | | | | | |
| experiment arrangement | Repeat 1 | Repeat 2 | Repeat 3 | Repeat 4 | average | increase ratio (%) |
| fertilizer for experiment | 6480 | 6540 | 5520 | 6100 | 6160 | 16.56 |
| experiment fertilizer + farmyard manure | 11760 | 11680 | 12400 | 11440 | 11820 | 56.51 |
| conventional fertilizer | 9460 | 10620 | 10140 | 10180 | 10100 | 49.11 |
| control | 5300 | 4880 | 5000 | 5920 | 5140 | |

(IV) The four arrangements caused little effect on maize's biological properties. There was no obvious differences in the aspects of budding time, the color and growth of the seedling parts above soil surface, tasseling time, the number of ears on a single plant, array and color of seeds. Therefore, the four arrangements caused little effect on maize's biological properties.

(V) The four arrangements caused great effect on maize's yields and the value of output. As shown in Table 2 and Table 3, the yield differences were great among the plots with and without fertilizing. The yield of corn increased by 16.56% using the fertilizer for experiment, by 56.51% applying the fertilizer for experiment plus farmyard manure and by 49.11% using conventional fertilizing. The output increase effects were all very obvious.

(VI) In light of input-output ratio, only arrangement 2 and arrangement 3 were compared with each other because the other input items were same but the applied fertilizers were different:

In arrangement 2, 300 kg of the fertilizer for the experiment were applied for each hectare, then the corresponding cost is 5 Yuan×300=1,500 Yuan (calculated on the basis of the fact that the cost of the fertilizer is 5 yuan per kg). The 22,500 kg of farmyard manure were applied, then corresponding cost is 0.05 Yuan×22,500=1125 Yuan (calculated on the basis of the fact that the cost of the farmyard manure is 0.05 yuan per kg), the total is 2,625 Yuan. The value of output is 1 Yuan×11,820=11,820 Yuan (calculated according to the price of 1 yuan per kg of the maize this year). The input-output ratio is 1:4.50.

In arrangement 3, 1,200 kg of SV special fertilizer were applied for maize, the corresponding cost is 1,400×1.2=1,680 Yuan, and the cost of farmyard manure is 1125 Yuan, the sum is 2,805 Yuan. The output value is 1 Yuan×10,100=10,100 Yuan. The input-output ratio is 1:3.54.

(VII) statistic analysis about the data in Table 2

TABLE 4

Statistic analysis about experimental results in maize field test

| Arrangement | Repeat 1 | 2 | 3 | 4 | average | sum |
|---|---|---|---|---|---|---|
| 1 | 32.4 | 32.7 | 27.6 | 30.5 | 30.8 | 123.2 |
| 2 | 58.8 | 58.4 | 62.0 | 57.2 | 59.1 | 236.4 |
| 3 | 47.3 | 53.1 | 50.7 | 50.9 | 50.5 | 202.0 |
| 4 | 26.5 | 24.4 | 25.0 | 26.9 | 25.7 | 102.8 |
| average | 41.3 | 42.1 | 41.3 | 41.4 | | |
| sum | 165.0 | 168.6 | 165.3 | 165.5 | | 664.4 |

The data in the table were statistically calculated and carried out variance analysis, as the results were shown in Table 5.

TABLE 5

Variance analysis of random group design

| variance source | DF | SS | $S^2$ | F | $F_{0.05}$ | $F_{0.01}$ |
|---|---|---|---|---|---|---|
| inter-arrangement | 3 | 3019.55 | 1006.52 | 187.09 | 3.86 | 6.99 |
| inter-repeat | 3 | 2.115 | 0.705 | 0.13 | | |
| error | 9 | 48.445 | 5.38 | | | |
| total variance | 15 | 3070.11 | | | | |

Because in inter-arrangement, $F=187.09 \gg F_{0.01}=6.69$, the difference among inter-arrangement was very obvious, but in inter-repeat, $F=0.13 < F_{0.05}=3.86$, so the difference among inter-repeat was not obvious.

The difference significance of the four arrangements were compared by LSR method, and the results were shown in Tables 6 and 7. SE=1.160

TABLE 6

| | LSR table | | |
|---|---|---|---|
| P | 2 | 3 | 4 |
| $SSR_{0.05}$ | 3.20 | 3.34 | 3.41 |
| $SSR_{0.01}$ | 4.60 | 4.86 | 4.99 |
| $LSR_{0.05}$ | 3.71 | 3.87 | 3.96 |
| $LSR_{0.01}$ | 5.34 | 5.64 | 5.79 |

TABLE 7

Contrast of the difference significance among the four arrangements

| four arrangement | average plot output (kg) | difference significance $\alpha = 0.05$ | $\alpha = 0.01$ |
|---|---|---|---|
| fertilizer for experiment + farmyard manure | 59.1 | a | A |
| conventional fertilization | 50.5 | b | B |
| fertilizer for experiment | 30.8 | c | C |
| control | 25.7 | d | C |

It was shown in Table 7 that the result difference among the four arrangements were all obvious, of which the fertilizer effect of the mixture of the slow and controlled-release polymeric fertilizer with multiple nutrients of the invention special for maize plus farmyard manure is obviously higher than that of the other arrangements.

(2) Field Experiment of Potato

① Materials and Methods

Soil for experiment: a soil north to Qingyanglin Village, Lijiaping Township, Wuzhai County, Xinzhou Prefecture was selected as the experimental soil. That soil mainly grows potato and was flat, convenient for transportation, management and observation. The experimental soil was mountain brown earth with a nature of medium soil and medium fertility. Its representative area was about 100 hm². The prior crops were potato, with 15,000 kg of farmyard manure, 1,125 kg of carbamide and 375 kg of calcium superphosphate applied in each hectare of the field, and the output was about 14,250 kg/hm².

Fertilizer for the experiment: the slow and controlled-release polymeric fertilizer with multiple nutrients special for potato of the invention.

Crops for the experiment: potato (DiXi-rui).

Experiment scheme and method: The experiment was made with four arrangements:

(I) Arrangement 1': the fertilizer for the experiment; 0.03 kg/m² (1.5 kg/plot)

(II) Arrangement 2': the fertilizer for the experiment plus farmyard manure; 0.03 kg/m² (1.5 kg/plot) of the fertilizer for the experiment plus 1.58 kg/M² (79 kg/plot) of farmyard manure (III) Arrangement 3': conventional fertilization; 0.11 kg/m² (5.5 kg/plot) of carbamide plus 0.04 kg/m² (2 kg/plot) of calcium superphosphate plus 1.58 kg/m² (79 kg/plot) of farmyard manure (IV) Arrangement 4': control; with no fertilizer applied.

Each of the four arrangements was repeated four times.

The experimental field was divided into four regions (four repeats) by the method of partial control, and then each region was divided into four plots of 10 m×5 m (four arrangements), with the plot area of 50 m². The plots were arranged randomly in each region, and the arrangements for this experiment were:

| Repeat 1' | Repeat 2' | Repeat 3' | Repeat 4' |
|---|---|---|---|
| Arrangement 2' | Arrangement 3' | Arrangement 3' | Arrangement 4' |
| Arrangement 1' | Arrangement 4' | Arrangement 1' | Arrangement 2' |
| Arrangement 4' | Arrangement 1' | Arrangement 2' | Arrangement 3' |
| Arrangement 3' | Arrangement 2' | Arrangement 4' | Arrangement 1' |

Before sowing, soil samples were collected from the field by 5-spot sampling method and brought to the laboratory for test and analysis.

Cultivating and sowing were conducted on 16 May 2004. Ploughing and sowing were carried out after applying determined amount of fertilizer and marking the boundaries and plots with wooden signs. The quantity of seed was 840 kg/hm². The field is dry land and cannot be irrigated. The field was weeded twice respectively on 25 June and 22 July and the crops were earthed up on 9 August. There was no disaster in 2004. The potatoes were harvested plot by plot on 10 Oct. 2004 and weighed for every plot. The results were recorded in tables.

②Result and Analysis (I) The results of laboratory test and analysis for soil samples of the experimental soil were shown in Table 8.

TABLE 8

Analysis result of soil sample of the experiment soil

| organic substance (g/kg) | alkali nitrogen (g/kg) | available phosphorus (mg/kg) | available potassium (mg/kg) | pH |
|---|---|---|---|---|
| 11.03 | 1.22 | 44.48 | 110.56 | 6.8 |

(II) The experimental results of the yield of each plot were shown in Table 9.

TABLE 9

Potato output of experiment plots

| | | plot output (kg) | | | | |
|---|---|---|---|---|---|---|
| experiment arrangement | plot area (m²) | Repeat 1' | Repeat 2' | Repeat 3' | Repeat 4' | average |
| fertilizer for experiment | 50 | 48.1 | 45.7 | 45.2 | 49.8 | 47.2 |
| fertilizer for experiment + farmyard manure | 50 | 83.6 | 87.1 | 84.8 | 84.5 | 85.0 |
| conventional fertilization | 50 | 75.4 | 72.3 | 73.6 | 76.7 | 74.5 |
| control | 50 | 40.1 | 39.4 | 37.9 | 41.4 | 39.7 |

(III) The hectare yield in potato experiment were shown in Table 10

TABLE 10

Hectare yield of each plot in potato experiment

| | output (kg/hm²) | | | | | |
|---|---|---|---|---|---|---|
| experiment arrangement | Repeat 1' | Repeat 2' | Repeat 3' | Repeat 4' | average | increase ratio (%) |
| fertilizer for experiment | 9620 | 9140 | 9040 | 9960 | 9440 | 15.89 |
| experiment fertilizer + farmyard manure | 16720 | 17420 | 16960 | 16900 | 17000 | 53.29 |
| conventional fertilizer | 15080 | 11460 | 14720 | 15340 | 14900 | 46.71 |
| control | 8020 | 7880 | 7580 | 8280 | 7940 | |

(IV) The four arrangements caused little effect on potato's biological properties. There was no obvious differences in the aspects of budding time, the color and growth of the seedling parts above soil surface, or florescence time, and there was neither obvious differences in color, surface smoothness and shape of the potato tubers underground. Therefore, the four arrangements caused little effect on potato's biological properties.

(V) The four arrangements caused great effect on potato's yields and the value of output. As shown in Table 9 and Table 10, the yield differences were great among the plots with and without fertilizing. The yield of potato increased by 15.89% using the fertilizer for experiment, by 53.29% applying the fertilizer for experiment plus farmyard manure and by 46.71% using conventional fertilizer. The yield increase effects were all very obvious.

(VI) In light of input-output ratio, only arrangement2' and arrangement 3' were compared with each other because the other input items were same but the applied fertilizers were different.

In arrangement 2', 300 kg of the fertilizer for the experiment were applied per hecture, the corresponding cost is 5 Yuan×300=1,500 Yuan (calculated on the basis of the fact that the cost of the fertilizer is 5 yuan per kg). The cost of farmyard manure is 0.05 Yuan×15,800=790 Yuan (calculated on the basis of the fact that the cost of the farmyard manure is 0.05 yuan per kg), the sum is 2290 Yuan. The value of output is 0.6 Yuan×17,000=10,200 Yuan (calculated according to the price of 0.6 yuan per kg of the photo this year). The input-output ratio is 1:4.45.

In Arrangement 3', 1,100 kg of carbamide were applied in each hectare, the corresponding cost is 1,500×1.1=1,650 Yuan; the amount of phosphorus fertilizer for each hectare was 400 kg, and the cost is 600×0.4=240 yuan; and the cost of farmyard manure is 790 Yuan, thus the sum is 3470 Yuan. The output value is 0.6 Yuan×14,900=8,940 Yuan. The input-output ratio is 1:3.34.

(VII) statistic analysis about the data in Table 11

TABLE 11

Statistic analysis about the experimental results in potato field test

| | Repeat | | | | | |
|---|---|---|---|---|---|---|
| Arrangement | 1 | 2 | 3 | 4 | average | sum |
| 1 | 48.1 | 45.7 | 45.2 | 49.8 | 47.2 | 188.8 |
| 2 | 83.6 | 87.1 | 84.8 | 84.5 | 85.0 | 340.0 |
| 3 | 75.4 | 72.3 | 73.6 | 76.7 | 74.5 | 298.0 |
| 4 | 40.1 | 39.4 | 37.9 | 41.4 | 39.7 | 158.8 |
| average | 61.8 | 61.1 | 60.4 | 63.1 | | |
| sum | 247.2 | 244.5 | 241.5 | 252.4 | | T = 985.6 |

The data in the table were statistically calculated and carried out variance analysis about the results. The results were shown in Table 12.

TABLE 12

Variance analysis of random group design

| variance source | DF | SS | S² | F | $F_{0.05}$ | $F_{0.01}$ |
|---|---|---|---|---|---|---|
| inter-arrangement | 3 | 5603.76 | 1867.92 | 794.86** | 3.86 | 6.99 |
| inter-repeat | 3 | 17.025 | 5.675 | 2.41 | | |
| error | 9 | 21.135 | 2.35 | | | |
| total variance | 15 | 5641.92 | | | | |

Because in inter-arrangement, F=794.86>>$F_{0.01}$=6.69, the difference among the inter-arrangement was very obvious, but in inter-repeat, F=2.41<$F_{0.05}$=3.86, so the difference among the inter-repeat was not obvious.

The difference significance of the four arrangements were compared by LSR method, and the results were shown in Tables 13 and 14. SE=0.766

TABLE 13

LSR table

| P | 2 | 3 | 4 |
|---|---|---|---|
| $SSR_{0.05}$ | 3.20 | 3.34 | 3.41 |
| $SSR_{0.01}$ | 4.60 | 4.86 | 4.99 |
| $LSR_{0.05}$ | 2.45 | 2.56 | 2.61 |
| $LSR_{0.01}$ | 3.52 | 3.72 | 3.82 |

TABLE 14

The contrast of the difference significance among the four arrangements

| four arrangements | average plot output (kg) | difference significance | |
|---|---|---|---|
| | | $\alpha = 0.05$ | $\alpha = 0.01$ |
| fertilizer for experiment + farmyard manure | 85.0 | a | A |
| conventional fertilization | 74.5 | b | B |
| fertilizer for experiment | 47.2 | c | C |
| control | 39.7 | d | D |

It was shown in Table 14 that the result difference among the four arrangements were all obvious, of which the fertilizer effect of the mixture of the slow and controlled-release polymeric fertilizer with multiple nutrients special for potato of the invention plus farmyard manure is obviously higher than that of the other arrangements. And the effect of the fertilizer applied independently was much better than that of the control with no fertilizer applied.

Although some preferably embodiments of this invention are disclosed in the description, the skilled person should understand that these embodiments are not limitative, and the present invention does not intent to be limited by any specific example or embodiment for the reason that there will be improvement about the invention. Undoubtedly, the skilled person in the art will know other embodiments according to principle of the invention. Therefore, the scope of this invention will be covered by the intention, spirit and scope of the claims.

What is claimed is:

1. A slow and controlled-release polymeric fertilizer having general formula of (I):

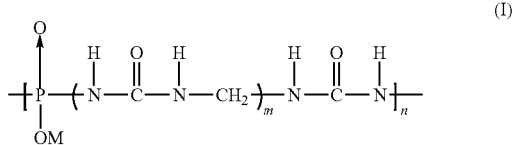

wherein n is in the range of from 50 to 200 μm is in the range of from 0 to 5, and for each repeat unit, M is a same or different microelement independently selected from the group consisting of K, $NH_4$, $NHCONH_2$ Fe, Cu, Zn, Mn, and Mg.

2. The slow and controlled-release polymeric fertilizer according to claim 1, based on the total mass of the slow and controlled-release polymeric fertilizer, comprising:

27.9% $K_2O$, 42% $P_2O_5$ and 16.6% N when m is 0 and all M is K;

12% $K_2O$, 18.2% $P_2O_5$ and 28.7% N when m is 3 and all M is K; and 8.2% $K_2O$, 12.5% $P_2O_5$ and 29.4% N when m is 5 and all M is K, wherein the amounts of K, P and N are calculated as that of $K_2O$, $P_2O_5$ and N respectively.

3. The slow and controlled-release polymeric fertilizer according to claim 1, based on the total mass of the slow and controlled-release polymeric fertilizer, comprising:

48.4% $P_2O_5$ and 28.6% N when m is 0 and all M is $NH_4$; and 19.5% $P_2O_5$ and 34.5% N when m is 3 and all M is $NH_4$, wherein the amounts of K, P and N are calculated as that of $K_2O$, $P_2O_5$ and N respectively.

4. The slow and controlled-release polymeric fertilizer according to claim 1, wherein the contents of nutrients K, P and N are adjusted respectively in the preparing process of preparation according to the requirements of crops and soils, with the content of the nutrients being in the adjustable range of 16~35% by mass of nitrogen, 13%~48% by mass of phosphorus and 6%~27% by mass of potassium.

5. The slow and controlled-release polymeric fertilizer according to claim 1, wherein a content of each microelement being in the range of 0.1% to 1% by mass.

6. A preparing process for the slow and controlled-release polymeric fertilizer of claim 1, comprising the steps of:
   (1) adding reactants and phosphoric acid into a first reactor and heating to generate dihydric phosphate, wherein said reactants are chloride, hydroxide or carbonate of potassium, bicarbonate of ammonium, and/or oxides or hydroxides of Fe, Cu Zn, Mn, and Mg;
   (2) adding carbamide and formaldehyde into a second reactor and adjusting the pH value to generate methylene urea oligomer at 80° C.;
   (3) adding the dihydric phosphate obtained in step (1) and product of step (2) or carbamide sufficient to provide enough amount of nitrogen into the second reactor, heating to start the reaction polycondensation, then making the reaction polycondensation continue under the action of the reaction heat; and
   (4) granulating the melted polycondensation product.

7. A method of fertilizing comprising:
   applying the slow and controlled-release polymeric fertilizer of claim 1 independently or in combination with farmyard manure to the soil.

8. A process for preparing the slow and controlled-release polymeric fertilizer of claim 1, comprising the steps of:
   (1) sequential adding 85% phosphoric acid, potassium chloride, water and potassium hydroxide into a first reactor and heating to 80° C. to generate dihydric phosphate, wherein the weight ratio of 85% phosphoric acid to potassium chloride to water to potassium hydroxide is 2.3:1.05:2:0.34;
   (2) adding 37% formaldehyde into a second reactor and adjusting the pH value to 8-9; adding carbamide at 60° C.; and then heating to 80° C. for 0.5 hours to generate methylene urea oligomer, wherein the weight ratio of carbamide to formaldehyde is 7.2:8.1; and
   (3) mixing the above two products from step (1) and step (2) at 80° C., wherein the said products being present in an amount sufficient to make the weight ratio of 85% phosphoric acid to carbamide being 2.3:7.2 to generate a final product, then granulating the final product in a granulator and drying.

9. A process for preparing the slow and controlled-release polymeric fertilizer of claim 1, comprising the steps of:
  (1) sequential adding 85% phosphoric acid, potassium chloride, water and potassium hydroxide into a first reactor and heating to 80° C. to generate dihydric phosphate, wherein the weight ratio of 85% phosphoric acid to potassium chloride to water to potassium hydroxide is 2.3:1.05:2:0.34;
  (2) adding 37% formaldehyde into a second reactor and adjusting the pH value to 8-9; adding carbamide at 60° C.; and then heating to 80° C. for 0.5 hours to generate methylene urea oligomer, wherein the weight ratio of carbamide to formaldehyde is 4.8:4.9; and
  (3) mixing the above two products from step (1) and step (2) at 80° C., wherein the said products being present in an amount sufficient to make the weight ratio of 85% phosphoric acid to carbamide being 2.3:4.8 to generate a final product, then granulating the final product in a granulator and drying.

10. A process for preparing the slow and controlled-release polymeric fertilizer of claim 1, comprising the steps of:
  (1) sequential adding 85% phosphoric acid, potassium chloride, water and potassium hydroxide into a first reactor to generate dihydric phosphate, wherein the weight ratio of 85% phosphoric acid to potassium chloride to water to potassium hydroxide is 6.9:3.15:3:1;
  (2) adding carbamide into the product obtained from step (1) and heating to 60° C., wherein the carbamide being present in an amount sufficient to make the weight ratio of 85% phosphoric acid to carbamide being 6.9:3.6 to generate a reaction system;
  (3) sequentially heating until the reaction system is boiled; removing the heater and cooling the reaction system to semi-solid state to generate a final product when the reaction system became viscous; and
  (4) then granulating the final product in a granulator and drying.

11. A process for preparing the slow and controlled-release polymeric fertilizer of claim 1, comprising the steps of:
  (1) adding 85% phosphoric acid, ammonium bicarbonate into a first reactor and reacting at 60° C., wherein the weight ratio of 85% phosphoric acid to ammonium bicarbonate is 6.9:4.8;
  (2) adding carbamide into the product obtained from step (1) and heating to 60° C., wherein the carbamide being present in an amount sufficient to make the weight ratio of carbamide to 85% phosphoric acid being 3.6:6.9 to generate a final product; and
  (3) then granulating the final product in a granulator and drying.

12. A process for preparing the slow and controlled-release polymeric fertilizer of claim 1, comprising the steps of:
  (1) adding 85% phosphoric acid, ammonium bicarbonate into a first reactor and reacting at 60° C., wherein the weight ratio of 85% phosphoric acid to ammonium bicarbonate is 4.6:3.2;
  (2) adding 37% formaldehyde into a second reactor and adjusting the pH value to 8-9; adding carbamide at 60° C.; and then heating to 80° C. for 0.5 hours to generate methylene urea oligomer, wherein the weight ratio of carbamide to formaldehyde is 9.6:9.8; and
  (3) mixing the above two products from step (1) and step (2) at 80° C., wherein the said products being present in an amount sufficient to make the weight ratio of 85% phosphoric acid to carbamide being 4.6:9.6 to generate a final product, then granulating the final product in a granulator and drying.

* * * * *

UNITED STATES PATENT AND TRADEMARK OFFICE
CERTIFICATE OF CORRECTION

| | | |
|---|---|---|
| PATENT NO. | : 7,753,984 B2 | Page 1 of 2 |
| APPLICATION NO. | : 11/400602 | |
| DATED | : July 13, 2010 | |
| INVENTOR(S) | : Yaqing Liu et al. | |

It is certified that error appears in the above-identified patent and that said Letters Patent is hereby corrected as shown below:

In column 1, line 46, change "acidifing" to --acidifying--.

In column 3, line 51 (approx.), change "N %" to --N%--.

In column 3, line 51 (approx.), change "$K_2O$ %" to --$K_2O$%--.

In column 4, line 30, change "pelltize" to --pelletize--.

In column 4, line 45, change "Were" to --were--.

In column 4, line 45, change "untill" to --until--.

In column 4, line 56, change "pelltized" to --pelletized--.

In column 5, line 8, change "pelltized" to --pelletized--.

In column 5, line 31, change "pelltized" to --pelletized--.

In column 5, line 46 (approx.), change "untill" to --until--.

In column 5, line 48, change "pelltized" to --pelletized--.

In column 6, line 2, change "pelltized" to --pelletized--.

In column 7, line 6, after "plot)" insert --.--.

In column 7, line 9 (approx.), change "$kg/M^2$" to --$kg/m^2$--.

In column 7, line 10 (approx.), after "manure" insert --.--.

In column 7, line 14, after "manure" insert --.--.

In column 7, line 40 (approx.), change "sowingg" to --sowing--.

Signed and Sealed this
Fourteenth Day of August, 2012

David J. Kappos
*Director of the United States Patent and Trademark Office*

CERTIFICATE OF CORRECTION (continued)

U.S. Pat. No. 7,753,984 B2

In column 7, line 45, change ""ETHOXALAMINE"" to --"ETHANOLAMINE"--.

In column 10, line 39, after "plot)" insert --.--.

In column 10, line 42, change "kg/M$^2$" to --kg/m$^2$--.

In column 10, line 43, after "manure" insert --.--.

In column 10, line 44, change "Arrangement3'" to --Arrangement 3'--.

In column 10, line 47, after "manure" insert --.--.

In column 11, line 45, after "Table 10" insert --.--.

In column 12, line 12, change "arrangement2'" to --arrangement 2'--.

In column 12, line 34, after "Table 11" insert --.--.

In column 13, line 60, in claim 1, change "200 μm" to --200, m--.

In column 13, line 63, in claim 1, change "NHCONH$_2$" to --NHCONH$_2$,--.